US012455519B2

(12) United States Patent
Matsuo et al.

(10) Patent No.: US 12,455,519 B2
(45) Date of Patent: Oct. 28, 2025

(54) FIXING DEVICE

(71) Applicant: CANON KABUSHIKI KAISHA, Tokyo (JP)

(72) Inventors: Takamichi Matsuo, Chiba (JP); Motoyasu Muramatsu, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 18/186,743

(22) Filed: Mar. 20, 2023

(65) Prior Publication Data

US 2023/0314992 A1 Oct. 5, 2023

(30) Foreign Application Priority Data

Mar. 30, 2022 (JP) ................................ 2022-055242

(51) Int. Cl.
*G03G 15/20* (2006.01)
*G03G 21/16* (2006.01)

(52) U.S. Cl.
CPC ..... *G03G 15/2017* (2013.01); *G03G 15/2053* (2013.01); *G03G 15/2064* (2013.01); *G03G 21/1652* (2013.01); *G03G 2215/2035* (2013.01); *G03G 2221/1639* (2013.01); *G03G 2221/166* (2013.01)

(58) Field of Classification Search
CPC .......... G03G 15/2017; G03G 15/2064; G03G 21/1652; G03G 2221/1639; G03G 2221/166
See application file for complete search history.

(56) References Cited

U.S. PATENT DOCUMENTS

2020/0333735 A1* 10/2020 Okanemasa ....... G03G 15/2053

FOREIGN PATENT DOCUMENTS

| | | | |
|---|---|---|---|
| JP | 2018146956 | A | 9/2018 |
| JP | 2019032399 | A | 2/2019 |
| JP | 2020003689 | A | 1/2020 |
| JP | 2020122814 | A | 8/2020 |
| JP | 2022047634 | A | 3/2022 |

* cited by examiner

*Primary Examiner* — Arlene Heredia Ocasio
(74) *Attorney, Agent, or Firm* — Canon U.S.A., Inc. IP Division

(57) ABSTRACT

A fixing device includes a roller, an apparatus frame, a connector and a heating unit having a film having a tubular shape, a heater, a heater holder disposed in an internal space of the film, and a unit holder disposed at a position at which the unit holder faces an end surface of the film in a longitudinal direction of the film. The connector includes an engagement portion configured to engage with a to-be-engaged portion of the unit holder in such a manner as to restrict the connector from becoming detached when a force in a direction in which the connector is detached is applied to the connector in a state in which the connector is electrically connected to the heater. The unit holder includes an abutment portion with which the heater holder comes into contact when a force in a direction toward the roller is applied to the connector.

6 Claims, 10 Drawing Sheets

FIXING DEVICE

BACKGROUND

Field

The present disclosure relates to a fixing device configured to be installed in an image forming apparatus, such as a printer or a copying machine, that employs an electrophotographic recording system.

Description of the Related Art

An example of a fixing device configured to be installed in an image forming apparatus is a device that uses a sheet-shaped heater, such as a ceramic heater. The sheet-shaped heater includes a sheet-shaped substrate, a heat-generating resistor pattern formed on the substrate, and an insulating protective layer covering the heat-generating resistor pattern. An electrode portion is provided at an end portion of the sheet-shaped heater in the longitudinal direction of the heater, and the electrode portion is electrically connected to the heat-generating resistor pattern and is connected to a terminal of a power supply connector. An electrical cable extending from the connector is connected to a unit connector that is included in the fixing device and that electrically connects the fixing device to a main body of the image forming apparatus. The heater and a power supply of the main body of the image forming apparatus are electrically connected to each other by the unit connector.

If an external force acts on the connector during assembly of the fixing device in a factory, there is a concern that the connector may be detached from the heater or that a contact failure may occur between the terminal of the connector and the electrode of the heater. Japanese Patent Laid-Open No. 2019-032399 discloses a configuration in which a locking member is added so as to make a connector less likely to be detached from a heater even if an external force acts on the connector.

SUMMARY

The present disclosure provides a fixing device that has a configuration in which a connector is not easily detached from a heater. For example, in a fixing device of the present disclosure, a unit holder includes an abutment portion with which a heater holder comes into contact when a force in a direction toward a roller is applied to a connector.

According to an aspect of the present disclosure, a fixing device in which a toner image formed on a recording medium is to be fixed onto the recording medium while the recording medium is pinched and conveyed at a fixing nip portion includes a heating unit that includes a film having a tubular shape, a heater having a long and narrow sheet-like shape, wherein the heater is disposed in an internal space of the film along a longitudinal direction of the film, and that further includes a heater holder disposed in the internal space of the film in such a manner as to hold the heater over the longitudinal direction, and a unit holder disposed at a position at which the unit holder faces an end surface of the film in the longitudinal direction, a roller having a shaft and configured to form, together with the heating unit, the fixing nip portion at which the recording medium is pinched and conveyed, an apparatus frame having a first surface side and a second surface side opposite to the first surface side and on which the film is faced, wherein the apparatus frame is configured to hold the heating unit and the roller by holding the unit holder and the shaft of the roller, and a connector configured to be electrically connected to the heater on the first surface side of the apparatus frame opposite to the second surface side of the apparatus frame on which the film is faced, wherein the connector includes an engagement portion configured to engage with a to-be-engaged portion of the unit holder in such a manner as to restrict the connector from becoming detached when a force in a direction in which the connector is detached is applied to the connector in a state in which the connector is electrically connected to the heater, and wherein the unit holder includes an abutment portion with which the heater holder comes into contact when a force in a direction toward the roller is applied to the connector.

Further features of the present disclosure will become apparent from the following description of exemplary embodiments with reference to the attached drawings.

DESCRIPTION OF THE EMBODIMENTS

First Embodiment

Figure 1:
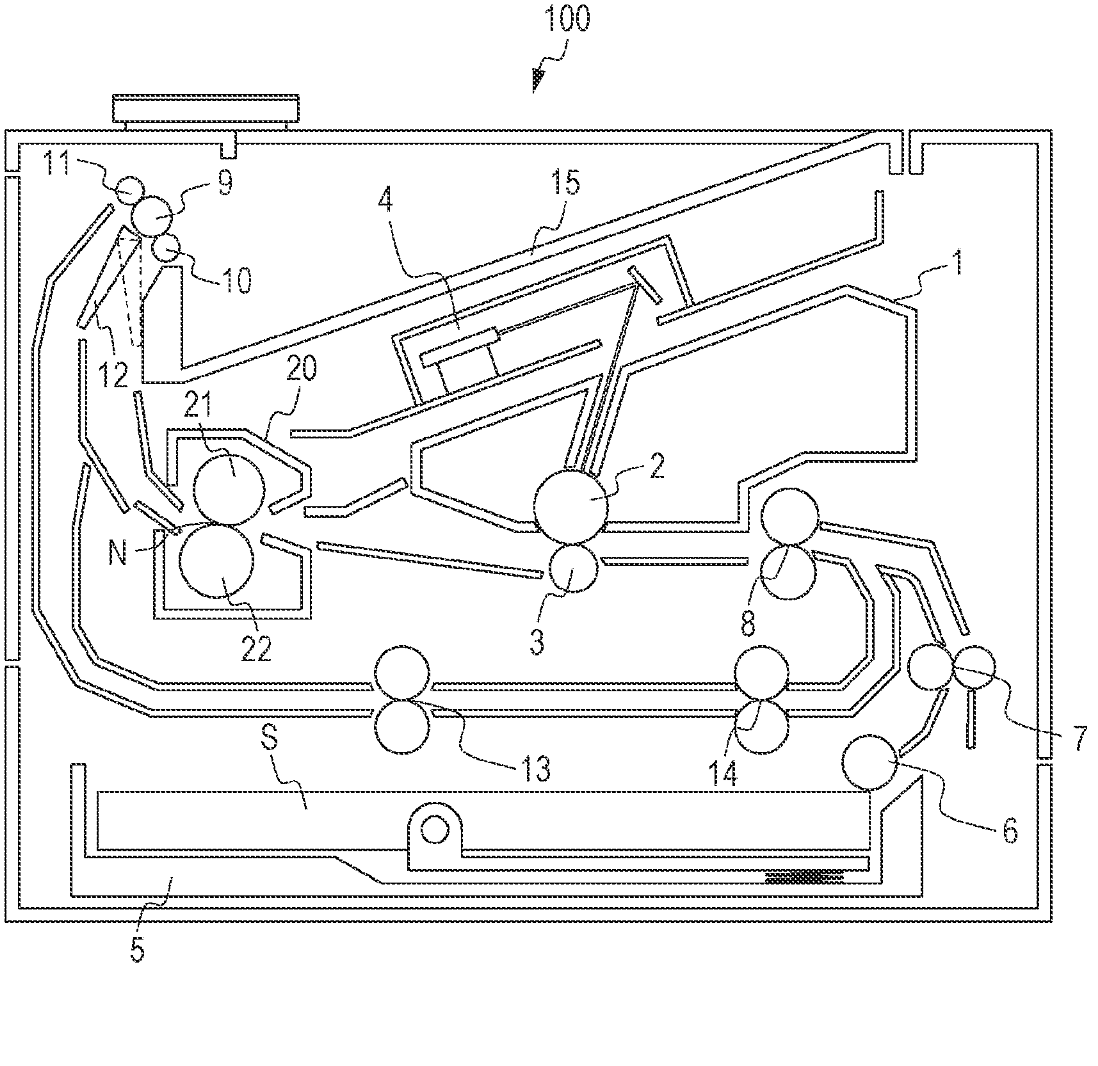
FIG. 1 is a sectional view of an image forming apparatus.

FIG. 1 is a sectional view of an image forming apparatus (a laser beam printer) 100 including a fixing device. The laser beam printer is an apparatus that employs an electrophotographic recording technology and forms a toner image onto a recording medium. Since the electrophotographic recording technology is a commonly known technology, an operation of the laser beam printer will now be briefly described with reference to FIG. 1.

A laser beam that is emitted from a scanner unit 4 and that corresponds to image information scans a photoconductor drum 2. An electrostatic latent image formed on the photoconductor drum 2 is developed with toner contained in a developing unit 1. A toner image formed on the photoconductor drum 2 is transferred onto one of recording media S that is conveyed to a conveying nip formed between the photoconductor drum 2 and a transfer roller 3. The recording media S are accommodated in a sheet feeding cassette 5 and fed one at a time by a pickup roller 6. Then, the recording media S are conveyed toward the conveying nip by conveying rollers 7 and registration rollers 8.

One of the recording media S to which a toner image has been transferred is heated and pressurized by a fixing device 20. As a result, the toner image is fixed onto the recording medium S. A reference sign 21 denotes a heating unit. A reference sign 22 denotes a pressure roller. A reference sign N denotes a fixing nip portion.

In the case of performing simplex printing on one of the recording media S, after the recording medium S has passed through the fixing device 20, the recording medium S is discharged onto a sheet discharge tray 15 by a discharge roller 9 and a discharge roller 10. A reference sign 12 denotes a flapper that switches the direction in which the recording media S are conveyed. In the case of performing duplex printing on one of the recording media S, the recording medium S is guided by the flapper 12 so as to be located between the discharge roller 9 and a reversing roller 11, and then the reversing roller 11 rotates in a reverse direction, so that the recording medium S is conveyed to a two-sided conveyance path. After that, the recording medium S is conveyed by conveying rollers 13 and 14, and a toner image is formed onto the second surface of the recording medium S through a process similar to that for the first surface of the recording medium S. The recording medium S having the toner images formed on the two surfaces thereof is discharged onto the sheet discharge tray 15.

Figure 2:
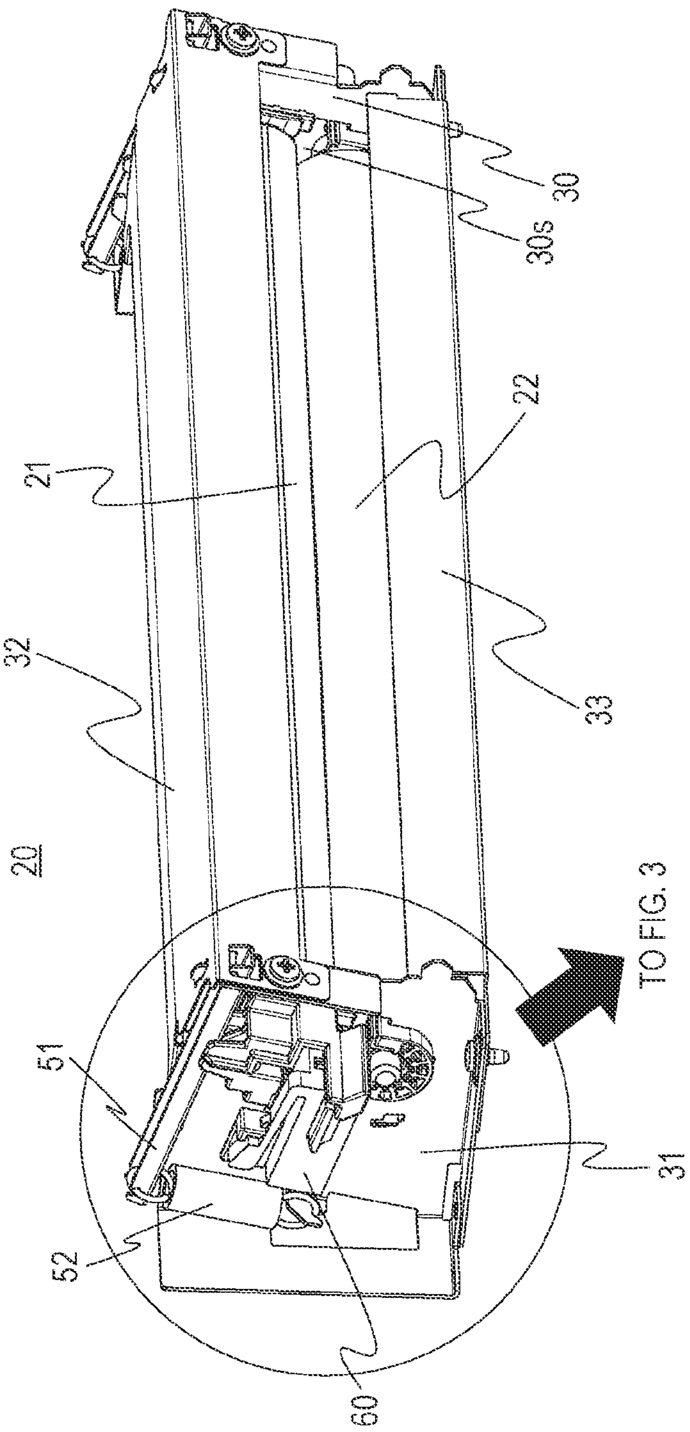
FIG. 2 is a perspective view of a fixing device.
Figure 3:
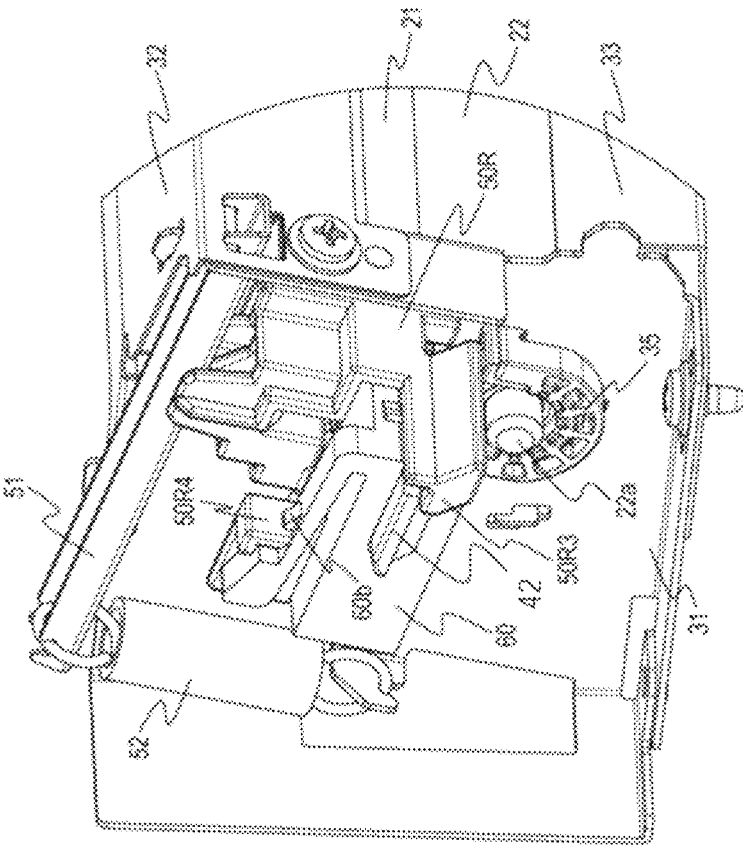
FIG. 3 is a partially enlarged view of the fixing device.
Figure 4:
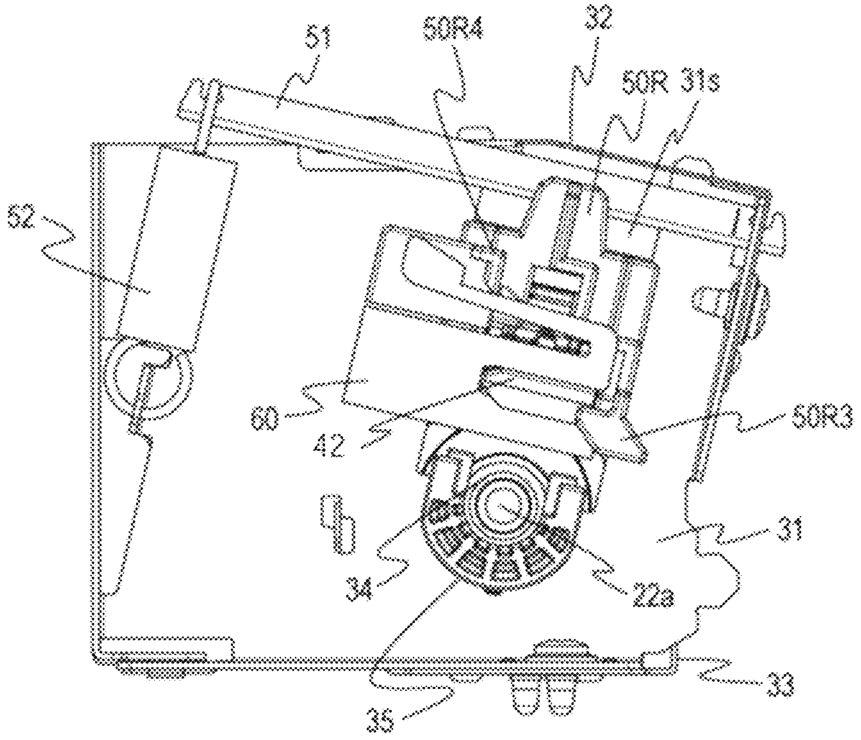
FIG. 4 is a side view of the fixing device.

The fixing device 20 of the present embodiment will now be described with reference to FIG. 2 to FIG. 9. FIG. 2 is a diagram illustrating the overall configuration of the fixing device 20. FIG. 3 is an enlarged view of a portion of FIG. 2. FIG. 4 is a left-hand side view of FIG. 2.

The heating unit 21 and the pressure roller 22 are supported by a frame (an apparatus frame). The frame includes a first side plate 30, a second side plate 31, an upper stay 32, and a lower stay 33.

The first side plate 30 and the second side plate 31 are arranged such that the first side plate 30 is positioned at one end of the fixing device 20 and that the second side plate 31 is positioned at the other end of the fixing device 20 in the longitudinal direction of the fixing device 20. The first side plate 30 has a groove portion 30*s* (see FIG. 2) that has a U-shape and to which the heating unit 21 and the pressure roller 22 are fitted. Similarly, the second side plate 31 has a groove portion 31*s* (see FIG. 4) that has a U-shape and to which the heating unit 21 and the pressure roller 22 are fitted.

The pressure roller 22 is a roller including a shaft 22*a* and an elastic layer, the elastic layer being made of a silicone rubber or the like and disposed over the outer periphery of the shaft 22*a*, and the pressure roller 22 includes a fluororesin layer formed on a surface thereof. Bearings 34 are attached to the two ends of the shaft 22*a* of the pressure roller 22. The bearings 34 are fitted to bearing holders 35, one of which is fitted in the groove portion 30*s* of the first side plate 30 and the other of which is fitted in the groove portion 31*s* of the second side plate 31, so that the pressure roller 22 is rotatably supported by the frame.

Figure 5:
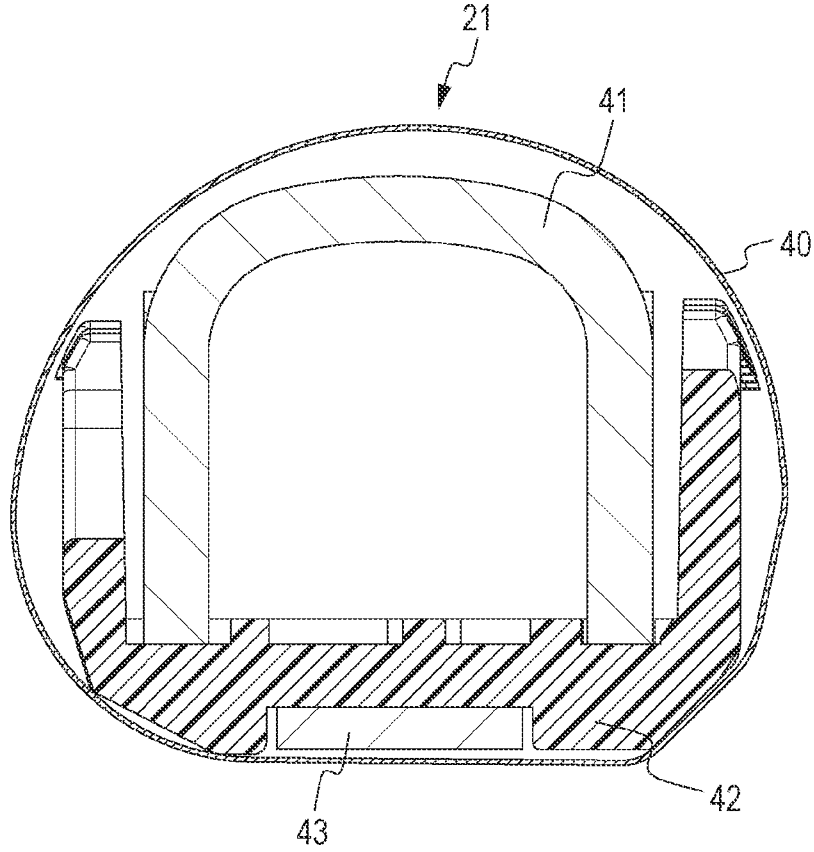
FIG. 5 is a cross-sectional view of a heating unit.
Figure 6:
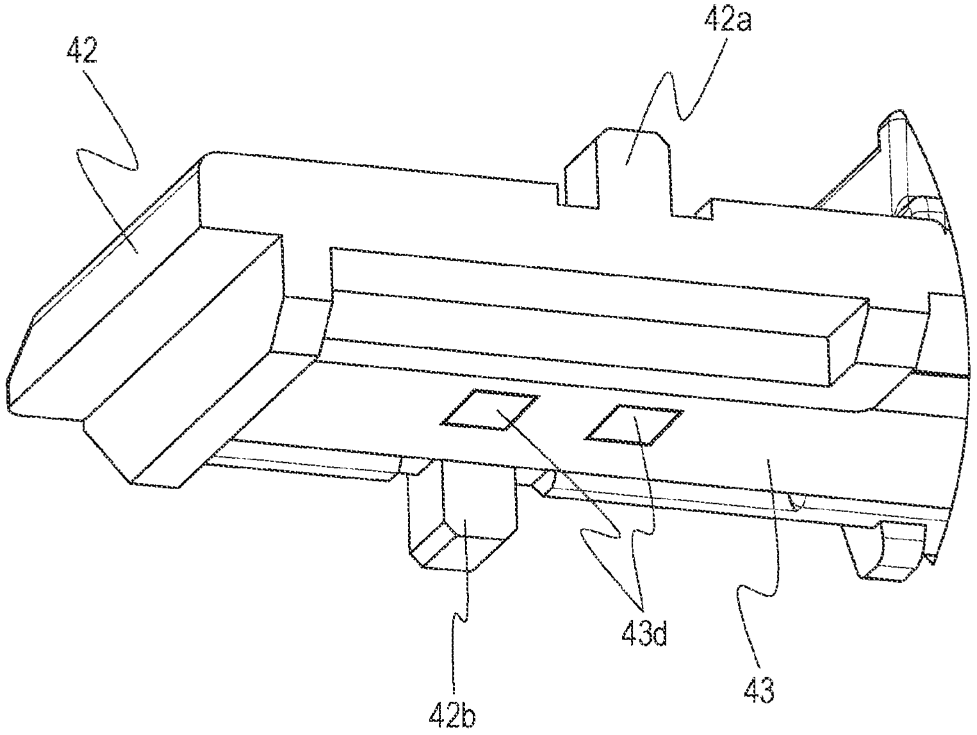
FIG. 6 is a perspective view of a heater holder holding a heater.
Figure 7:
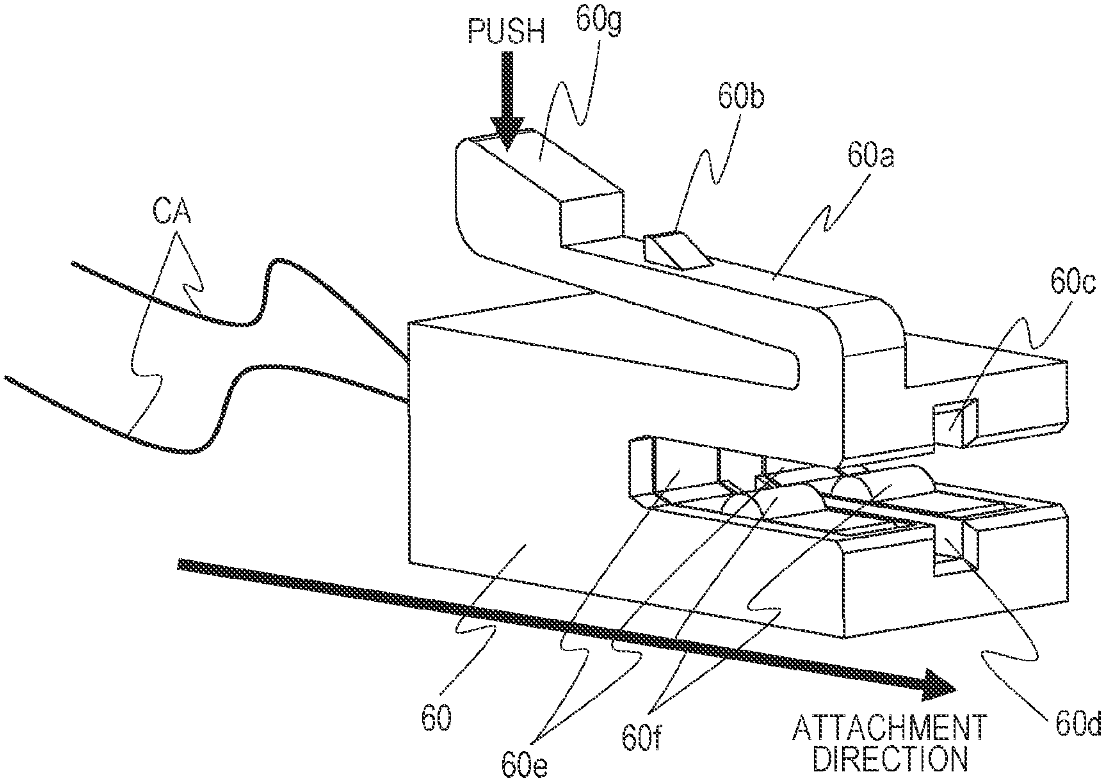
FIG. 7 is a perspective view of a connector.
Figure 8A:
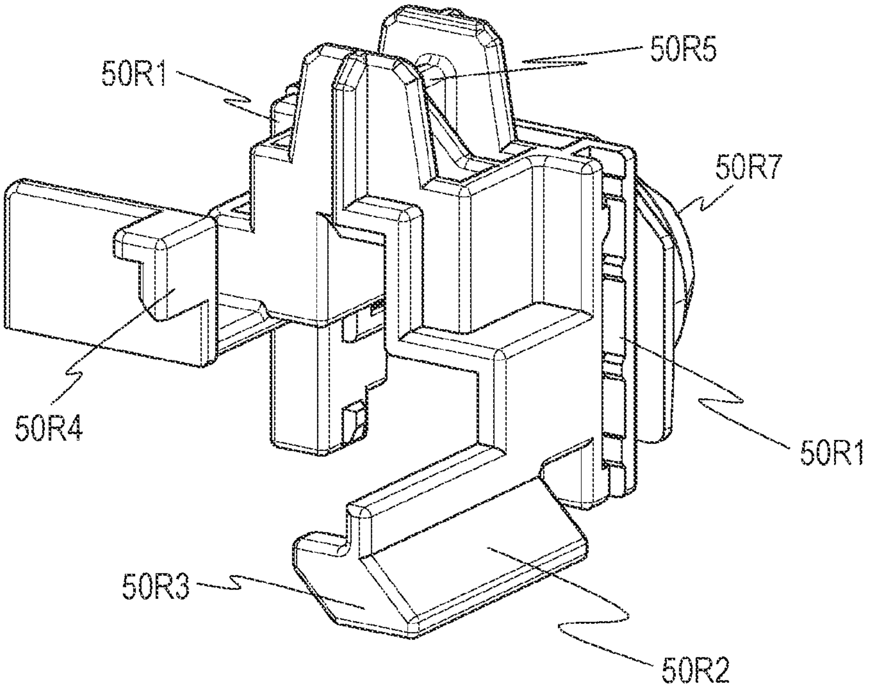
FIGS. 8A and 8B are perspective views of a flange.
Figure 8B:
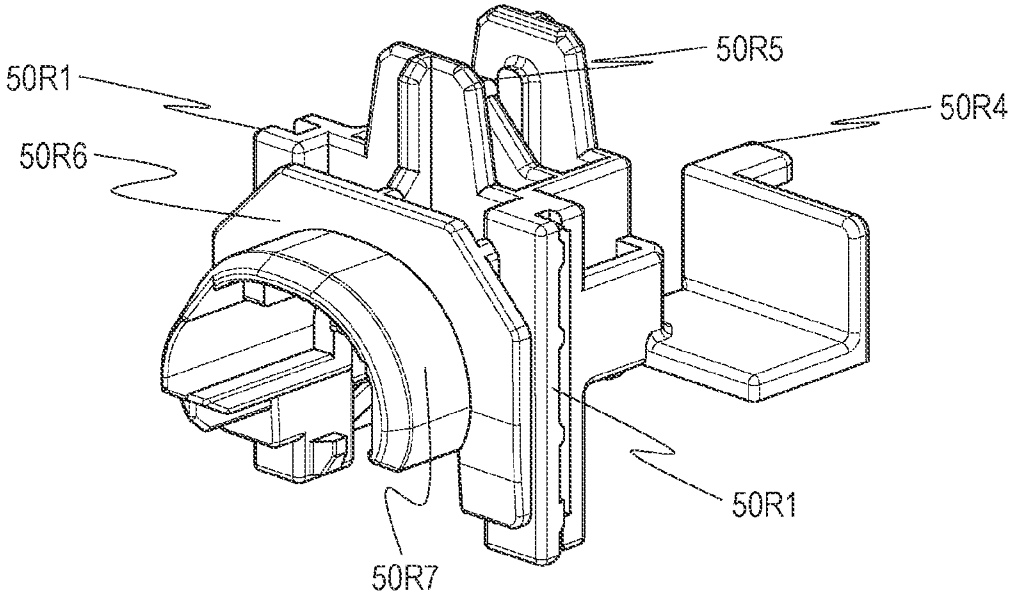
Figure 9:
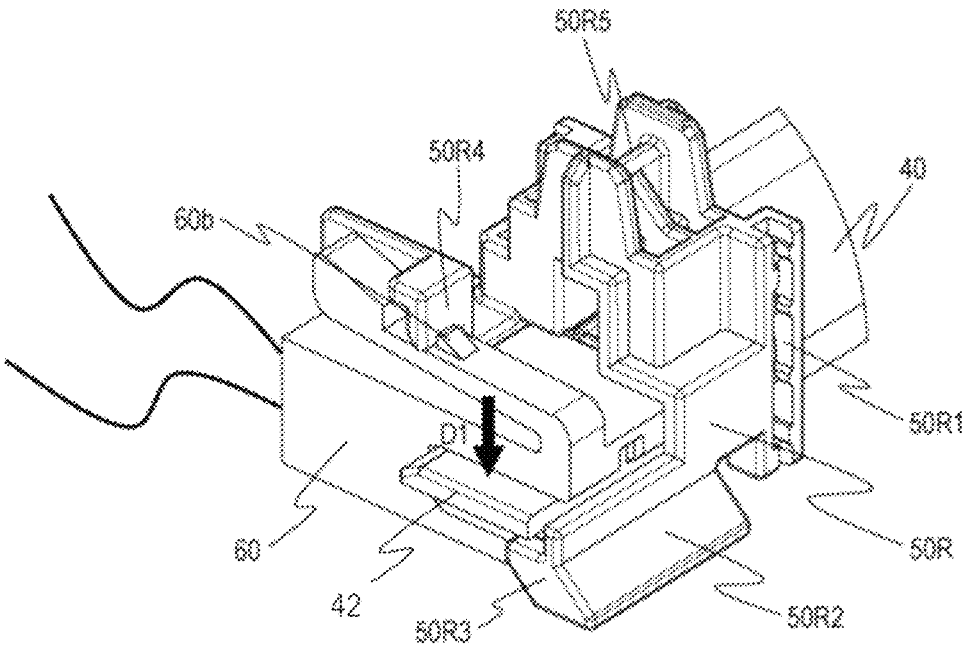
FIG. 9 is a partially enlarged view of the fixing device.

As illustrated in FIG. 5, the heating unit 21 includes a tubular film 40 and a heater 43 that is disposed in the internal space of the film 40 along the longitudinal direction of the film 40 (a generatrix direction). In addition to the heater 43, a heater holder 42 and a stay 41 are arranged in the internal space of the film 40. The heater holder 42 holds the heater 43 and has a function of guiding rotation of the film 40, and the stay 41 reinforces the heater holder 42. The heater 43, the heater holder 42, and the stay 41 are each a component that is long in the longitudinal direction of the film 40 and that has a small width and each have two end portions projecting from the two ends of the film 40. Flanges 50R and 50L (the flange 50L is not illustrated) are provided at positions where they face the end surfaces of the film 40. The flanges 50R and 50L serve as unit holders that cause the frame to hold the heating unit 21. The flanges 50R and 50L of the present embodiment also have a function of serving as restricting members that restrict a deviating movement of the film 40 in the longitudinal direction of the film 40. FIGS. 8A and 8B are perspective views of the flange 50R. FIG. 8B is a diagram illustrating the flange 50R illustrated in FIG. 8A when viewed from the rear side of the flange 50R. The flange 50R (50L) has a receiving surface 50R6 that receives one of the end surfaces of the film 40 and an inner-surface receiving portion 50R7 that receives the inner peripheral surface of one of the longitudinal end portions of the film 40.

The flange 50R (50L) is fitted into the groove portion 30*s* (31*s*) of the frame in a direction toward the pressure roller 22. As a result, the heating unit 21 is attached to the frame.

The film 40 is a rotary member that has flexibility and includes a base layer made of resin or metal, and the film 40 has a silicone rubber layer and a surface layer made of a fluorocarbon resin. The heater holder 42 is made of a heat-resistant resin such as a liquid crystal polymer, and the stay 41 is made of a metal such as iron.

The heater 43 is a sheet-shaped heater including a ceramic substrate and a heat-generating resistor formed on the ceramic substrate, and power supply electrodes 43*d* are also printed on an end portion of the heater 43 in the longitudinal direction of the heater 43.

The flange 50R (50L) is pressurized by a pressurizing plate 51 and a pressurizing spring 52 against the pressure roller 22. The flange 50R has a guide groove 50R1 that is used for fitting the flange 50R into the groove portion 30*s* of the frame and includes a force receiving portion 50R5 that receives the pressure from the pressurizing plate 51. The same applies to the flange 50L, which is not illustrated. The pressure received by the flange 50R (50L) is transmitted to the stay 41, the heater holder 42, the heater 43, the film 40, and the pressure roller 22 in this order. As a result, the fixing nip portion N (see FIG. 1) is formed between the film 40 and the pressure roller 22. In other words, the heater 43 and the pressure roller 22 form the fixing nip portion N with the film 40 interposed between the heater 43 and the pressure roller 22.

The pressure roller 22 rotates by receiving a motive power from a motor, which is not illustrated. The film 40 is driven and rotated by the pressure roller 22.

An end portion of the heater holder 42 in the longitudinal direction of the heater 43 has a first protrusion 42*a* and a second protrusion 42*b*. The first protrusion 42*a* and the second protrusion 42*b* are inserted into a first recess 60*c* and a second recess 60*d* of a connector 60, which will be described below, so that the connector 60 is positioned with respect to the heater holder 42.

The connector 60 that electrically connects the heater 43 and the power supply of the main body of the image forming apparatus 100 to each other will now be described.

As illustrated in FIG. 2 to FIG. 9, the connector 60 is not provided on the side on which the flange 50L is disposed and is provided only on the side on which the flange 50R is disposed. The connector 60 is shaped so as to clamp the heater holder 42 holding the heater 43. The connector 60 includes an arm portion 60*a* and a connector engagement portion 60*b*. The connector engagement portion 60*b* is provided on the arm portion 60*a* and prevents the connector 60 from becoming detached. When the connector 60 is attached to the heater holder 42, the connector engagement portion 60*b* engages with a holder to-be-engaged portion 50R4 of the flange 50R while the arm portion 60*a* is bent, so that the connector 60 engages with the flange 50R.

When the connector 60 is detached from the heater holder 42, by pinching a to-be-pinched portion 60*g*, which is formed at an end of the arm portion 60*a*, with a finger so as to bend the arm portion 60*a*, the connector engagement portion 60*b* is caused to disengage from the holder to-be-engaged portion 50R4. As a result, the connector 60 can be moved in a direction opposite to the direction in which the connector 60 is attached to the flange 50R and can be detached from the flange 50R.

Conductive connection terminals 60*e* are accommodated in an insulating housing of the connector 60. Each of the connection terminals 60*e* includes a contact portion 60*f* that has a spring property and that is provided at one end of the connection terminal 60*e*. By bringing the contact portions 60*f* into contact with the electrodes 43*d* of the heater 43, the heater 43 and the connector 60 are electrically connected to each other. Cables CA are each connected to the other end of one of the connection terminals 60*e*, and power can be supplied to the heater 43 by connecting the cables CA to the power supply of the main body of the image forming apparatus 100.

Here, the electrodes 43*d* and the connection terminals 60*e* are each handled as an ignition source in terms of safety standards, and thus, in the case where a component made of a material that does not have sufficient flame retardancy is disposed around the electrodes 43*d* and the connection terminals 60*e*, the component needs to be shielded from the ignition sources. The component made of a material that does not have sufficient flame retardancy is, for example, a component whose rating in UL94, which is the standard for safety of flammability of plastic materials for parts in devices and appliances testing established by Underwriter's Laboratories, Inc., is HB. In the present embodiment, a material having a UL94 V-0 rating or higher is used for the heater holder 42 and the flange 50R, and in addition, the flange 50R is provided with a shielding portion 50R2, so that the connection terminals 60*e* are shielded from the peripheral components, and the safety is improved.

The fixing device 20 does not have a structure whereby it supports a portion of the heating unit 21 that projects outward from the second side plate 31 in the longitudinal direction of the heater 43. In other words, the portion of the heating unit 21 to which the connector 60 is attached is in a state resembling a cantilever. Thus, when an external force acts on the connector 60, a portion of the heater holder 42 that holds the connector 60 is likely to become deformed. Deformation of the heater holder 42 in a direction D1 illustrated in FIG. 9 reduces the degree of engagement between the connector engagement portion 60*b* and the holder to-be-engaged portion 50R4, and thus, in the case where deformation of the heater holder 42 in the direction D1 occurs, there is a possibility that the connector 60 may be moved in the direction opposite to the direction in which the connector 60 is attached to the flange 50R and may be detached from the flange 50R.

Accordingly, in the fixing device 20 of the present embodiment, the flange 50R includes a portion (an abutment portion 50R3) against which the heater holder 42 abuts when the heater holder 42 becomes deformed in the direction D1. When deformation of the heater holder 42 in the direction D1 occurs due to, for example, an external force applied to the connector 60, the heater holder 42 comes into contact with the abutment portion 50R3, so that the deformation of the heater holder 42 is suppressed.

If deformation of the heater holder 42 occurs due to a larger force applied to the connector 60, the heater holder 42 and the flange 50R will become deformed integrally.

By employing such a structure, a change in the relative positional relationship between the connector 60 and the flange 50R when an external force is applied to the connector 60 can be suppressed. In other words, the amount of change in the degree of engagement between the connector engagement portion 60*b* and the holder to-be-engaged portion 50R4 is small, and this makes the connector 60 less likely to become detached.

As described above, the fixing device of the present embodiment in which a toner image formed on a recording medium is fixed onto the recording medium while the recording medium is conveyed at the fixing nip portion includes the heating unit and so forth. The heating unit includes the tubular film and the sheet-shaped heater that is long and narrow and that is disposed in the internal space of the film along the longitudinal direction of the film. The heating unit further includes the heater holder that is disposed in the internal space of the film and that holds the heater over the longitudinal direction. The unit holder (flange) is disposed at a position where it faces the end surfaces of the film in the longitudinal direction.

The pressure roller (a roller) forms, together with the heating unit, the fixing nip portion at which a recording medium is pinched and conveyed.

The apparatus frame holds the heating unit and the roller by holding the unit holders and the shaft of the roller.

The connector is electrically connected to the heater on a surface side of the apparatus frame opposite to a surface side of the apparatus frame to which the film is faced. The connector includes the engagement portion that engages with the to-be-engaged portion of one of the unit holders so as to restrict the connector from becoming detached when a force in a direction in which the connector is detached is applied to the connector in a state where the connector is electrically connected to the heater.

One of the unit holders includes an abutment portion with which the heater holder comes into contact when a force in a direction toward the roller is applied to the connector.

One of the unit holders includes the shielding portion that covers the connection terminals of the connector.

Second Embodiment

Figure 10:
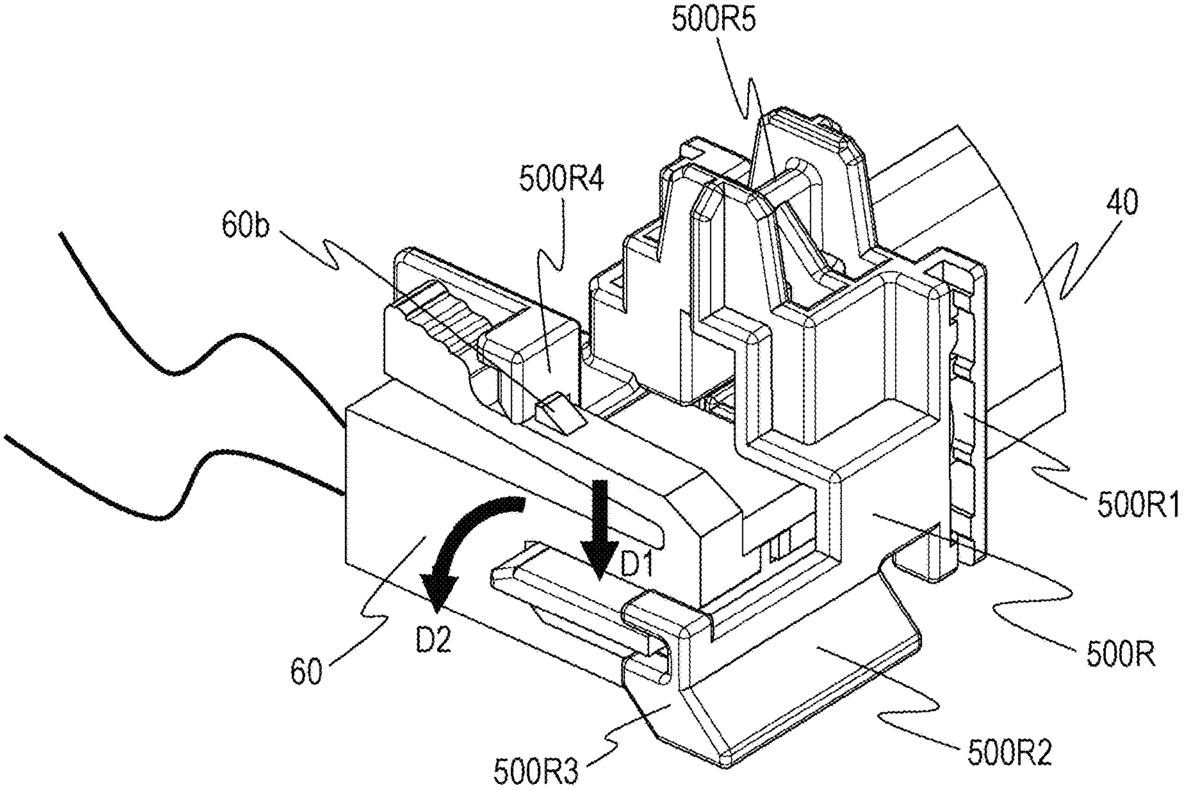
FIG. 10 is a partially enlarged view of a fixing device of a second embodiment of the present disclosure.

A fixing device of the second embodiment will now be described. The only difference between the first embodiment and the second embodiment is the configuration of one of the flanges. In the second embodiment, components that are the same as the components of the first embodiment or components having the same functions as the components of the first embodiment will be denoted by the same reference signs used in the first embodiment, and descriptions thereof will be omitted. FIG. 10 is a perspective view of a portion of the fixing device of the second embodiment. The degree of engagement of the connector engagement portion 60*b* is reduced not only when the heater holder 42 becomes deformed in the direction D1 but also when the heater holder 42 becomes deformed in a direction D2 (a direction of rotation of the roller when viewed in the axial direction of the roller).

Accordingly, a flange 500R that is included in the fixing device of the second embodiment has an engagement groove portion (a second abutment portion) 500R3. An end portion of the heater holder 42 is inserted into the engagement groove portion 500R3. When the end portion of the heater holder 42 becomes deformed in the direction D2, the heater holder 42 comes into contact with the engagement groove portion 500R3, and the flange 500R and the heater holder 42 move and become deformed integrally. Consequently, the relative positional relationship between the connector 60 and a holder to-be-engaged portion 500R4 does not change even if the heater holder 42 becomes deformed in the direction D2, and thus, the connector 60 will not become detached.

Note that a reference sign 500R1 denotes a guide groove. A reference sign 500R2 denotes a shielding portion. A reference sign 500R5 denotes a force receiving portion. The guide groove, the shielding portion, and the force receiving portion each have the same function as the flange 50R of the first embodiment.

The flange 500R can accommodate deformation of the heater holder 42 in the direction D1 and deformation of the heater holder 42 in the direction D2.

As described above, one of the unit holders of the fixing device of the present embodiment includes the second abutment portion with which the heater holder comes into contact when a force in the direction of rotation of the roller when viewed in the axial direction of the roller is applied to the connector.

In each of the above-described two embodiments, although the number of connectors used for supplying power to the heater in the apparatus is one, the present disclosure can be applied to an apparatus in which connectors are provided at the two ends of a heater in the longitudinal direction of the heater.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-055242, filed Mar. 30, 2022, which is hereby incorporated by reference herein in its entirety.

What is claimed is:

1. A fixing device in which a toner image formed on a recording medium is to be fixed onto the recording medium while the recording medium is pinched and conveyed at a fixing nip portion, the fixing device comprising:

a heating unit that includes a film having a tubular shape, a heater having a long and narrow sheet-like shape, wherein the heater is disposed in an internal space of the film along a longitudinal direction of the film, and that further includes a heater holder disposed in the internal space of the film in such a manner as to hold the heater over the longitudinal direction;

a heating unit holder configured to hold the heating unit and disposed at a position at which the heating unit holder faces an end surface of the film in the longitudinal direction, the heating unit holder includes an inner surface receiving portion entering the internal space of a longitudinal end of the film and configured to receive an inner surface of the longitudinal end of the film;

a roller having a shaft and configured to form, together with the heating unit, the fixing nip portion at which the recording medium is pinched and conveyed;

an apparatus frame having a first surface side facing the film and a second surface side opposite to the first surface side, the apparatus frame is configured to hold the heating unit and the roller by holding the heating unit holder and the shaft of the roller; and a connector configured to be electrically connected to the heater on the second surface side of the apparatus frame, wherein the connector includes an engagement portion configured to engage with a to-be-engaged portion of the heating unit holder in such a manner as to restrict the connector from becoming detached when a force in a direction in which the connector is detached is applied to the connector in a state in which the connector is electrically connected to the heater, wherein the heating unit holder includes an abutment portion overlapping with the connector with respect to the longitudinal direction, and overlapping with the heater holder when viewed in a direction perpendicular to a flat surface of the heater, wherein, when a force in a direction toward the roller is applied to the connector, the heater holder comes into contact with the abutment portion, and wherein the heating unit holder includes a shielding portion overlapping with a connection terminal of the connector with respect to the longitudinal direction and configured to cover the connection terminal of the connector when viewed in a direction perpendicular to the longitudinal direction and parallel to the flat surface of the heater.

2. The fixing device according to claim 1, wherein the abutment portion is a first abutment portion and the heating unit holder includes a second abutment portion with which the heater holder comes into contact when a force in a direction of rotation of the roller as seen in an axial direction of the roller is applied to the connector, wherein, with respect a to the direction perpendicular to the flat surface of the heater, the second abutment portion is provided on a side opposite to a side where the first abutment portion is provided with the heater holder as a boundary, and wherein, when viewed in the direction perpendicular to the flat surface of the heater, the first abutment portion, the heater holder, and the second abutment portion overlap.

3. The fixing device according to claim 1, wherein the connector further includes an arm portion configured to be elastically deformed in the direction toward the roller, and the engagement portion is provided on the arm portion.

4. A fixing device in which a toner image formed on a recording medium is to be fixed onto the recording medium while the recording medium is pinched and conveyed at a fixing nip portion, the fixing device comprising:

a frame;

a film that has a tubular shape and an outer peripheral surface and is configured to rotate while being in contact with the recording medium;

a heater that has a long and narrow sheet-like shape and that is disposed in an internal space of the film along a longitudinal direction of the film;

a heater holder that is disposed in the internal space of the film in such a manner as to hold the heater over the longitudinal direction;

a flange configured to restrict movement of the film in the longitudinal direction, wherein the flange is disposed at a position at which the flange faces an end surface of the film in the longitudinal direction and is attached to the frame;

a roller configured to contact the outer peripheral surface of the film and is configured to form the fixing nip portion together with the heater with the film interposed between the roller and the heater; and a connector configured as a power supply and to be electrically connected to the heater, wherein the connector includes an engagement portion configured to engage with a to-be-engaged portion of the flange in such a manner as to restrict the connector from becoming detached, wherein the flange includes an abutment portion overlapping with the connector with respect to the longitudinal direction, and overlapping with the heater holder when viewed in a direction perpendicular to a flat surface of the heater, wherein, when the heater holder is bent as a result of a force in a direction toward the roller being applied to the connector, the heater holder comes into contact with the abutment portion, and wherein the flange includes a shielding portion overlapping with a connection terminal of the connector with respect to the longitudinal direction and configured to cover a connection terminal of the connector when viewed in a direction perpendicular to the longitudinal direction and parallel to the flat surface of the heater.

5. The fixing device according to claim 4, wherein the abutment portion is a first abutment portion and the flange further includes a second abutment portion, wherein, with respect to the direction perpendicular to the flat surface of the heater, the second abutment portion is provided on a side opposite to a side where the first abutment portion is provided with the heater holder as a boundary, wherein, when viewed in the direction perpendicular to the flat surface of the heater, the first abutment portion, the heater holder, and the second abutment portion overlap, and wherein, the heater holder comes into contact with the second abutment portion when a force in a direction of rotation of the roller as seen in an axial direction of the roller is applied to the connector.

6. The fixing device according to claim 4, wherein the connector further includes an arm portion configured to be elastically deformed in the direction toward the roller, and the engagement portion is provided on the arm portion.

* * * * *